United States Patent [19]

D'Avello et al.

[11] Patent Number: 5,519,506
[45] Date of Patent: *May 21, 1996

[54] DATA COMMUNICATION SYSTEM WITH AUTOMATIC POWER CONTROL

[75] Inventors: Robert F. D'Avello, Lake Zurich; Manohar A. Joglekar, Long Grove, both of Ill.

[73] Assignee: Motorola, Inc., Schaumburg, Ill.

[*] Notice: The term of this patent shall not extend beyond the expiration date of Pat. No. 5,392,023.

[21] Appl. No.: 391,903

[22] Filed: Feb. 21, 1995

Related U.S. Application Data

[62] Division of Ser. No. 755,932, Sep. 6, 1991, Pat. No. 5,392,023.

[51] Int. Cl.⁶ .............................. H04N 1/00; H04N 1/32
[52] U.S. Cl. ...................... 358/400; 379/58; 379/100; 455/38.3; 455/343; 358/442
[58] Field of Search ................................ 358/400, 442, 358/468, 406, 434; 379/100, 58, 59, 63, 96, 97, 98; 455/343, 38.3, 69, 116, 13.4

[56] References Cited

U.S. PATENT DOCUMENTS 5,392,023  2/1995  D'Avello et al. ..................... 358/468

FOREIGN PATENT DOCUMENTS 2230162  10/1990  United Kingdom ............. H04Q 7/00
88/06830  9/1988  WIPO .............................. H04Q 7/04

*Primary Examiner*— Scott A. Rogers
*Assistant Examiner*—Fan Lee
*Attorney, Agent, or Firm*—Rolland R. Hackbart; Donald C. Kordich

[57] ABSTRACT

A communication system comprised of a transceiver (101) for transmitting and receiving data signals and a modulation/demodulation apparatus (102) to modulate the data signals from an accessory (109) for transmission and demodulate data signals after reception by the transceiver (101). A processing device (103) controls power to the various components of the communication system.

6 Claims, 3 Drawing Sheets

DATA COMMUNICATION SYSTEM WITH AUTOMATIC POWER CONTROL

This is a division of application Ser. No. 07/755,932, filed on Sep. 6, 1991, now U.S. Pat. No. 5,392,023.

FIELD OF THE INVENTION

The present invention relates generally to the field of communications and particularly to automatic power control of a communication system.

BACKGROUND OF THE INVENTION

A radiotelephone/facsimile combination allows a user to transmit and receive documents without having the constraints of a fixed office. A radiotelephone/computer combination permits a computer user to access a data base or to contact other computer users with a portable computer, also without being tied down to an office. If the computer has the proper modem, documents can also be sent from the computer to a facsimile machine. A typical radiotelephone is described in detail in Motorola Micro T•A•C manual #68P81150E49 available from the assignee of the present invention.

The problem with these schemes, however, is that these combinations are typically powered by a car's electrical system. To remain truly mobile, the radiotelephone/facsimile or radiotelephone/computer must be battery powered, allowing the user to take the combinations anywhere. This results in the combinations being powered by either one battery for both units of the combination or separately powering each unit with separate batteries, requiring a larger and heavier combination. With either power scheme, both units of the combination must either remain powered up to receive an incoming call or the facsimile or computer turned on manually when a telephone call is received that requires those units. In either case, the battery's usefulness will decrease due to the time the units are on and not being used. Even if the units are turned on and off manually when a call is received, there is still the possibility of it being inadvertently left on and draining the battery.

A radiotelephone/computer user may also want to send data out via a modem that is connected to the radiotelephone. In this case the radiotelephone must be left on or turned on and off manually when it is needed. There is a resulting need for a radiotelephone/computer or radiotelephone/facsimile combination that conserves battery power when not active.

SUMMARY OF THE INVENTION

The communication system of the present invention is comprised of transceiving means for transmitting and receiving data signals and modulation/demodulation means to modulate/demodulate the data signals for transmission and after reception. Processing means controls the operation of the communication system.

DETAILED DESCRIPTION OF THE PREFERRED EMBODIMENT

The data communication system utilizes a bidirectional power controller that controls power to a radiotelephone and facsimile machine, computer, or other accessory coupled to the radiotelephone. Thus, when an accessory is needed, power to that accessory is enabled.

Figure 1:
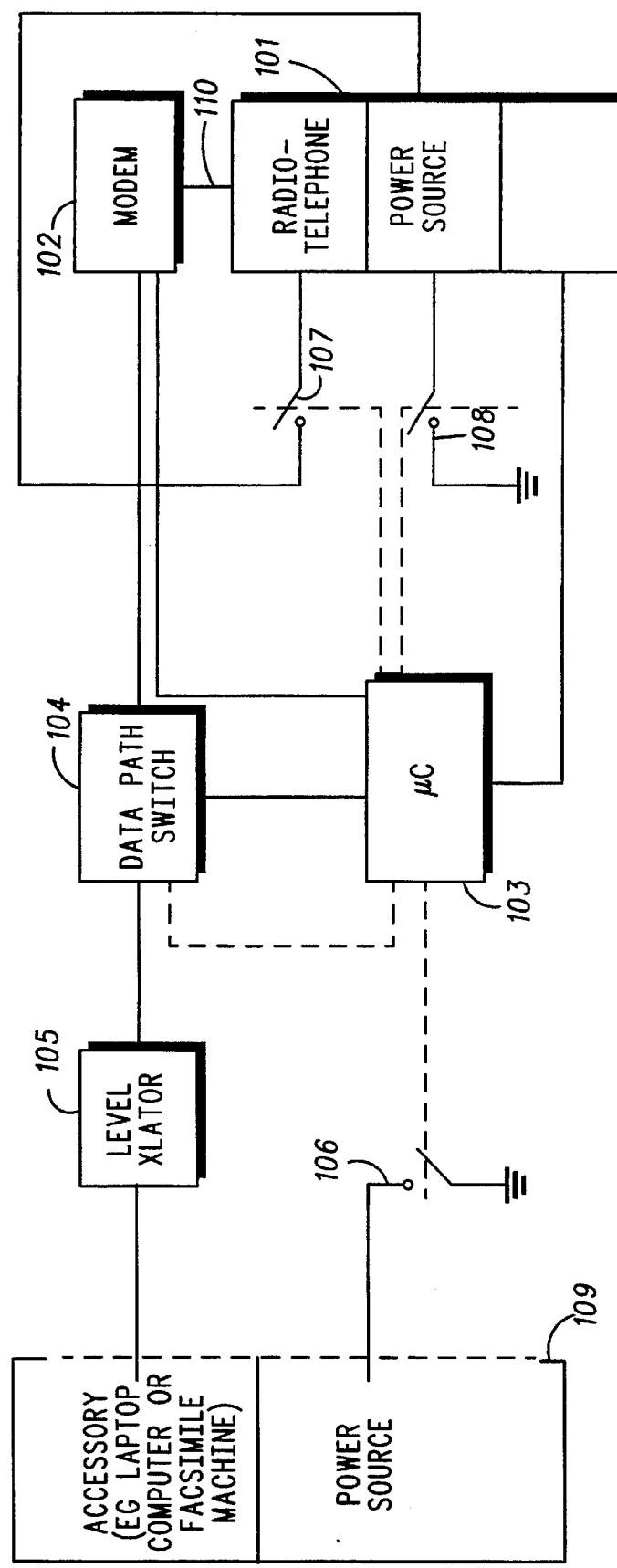
FIG. 1 shows a block diagram of the data communication system.

The preferred embodiment of the data communication system is illustrated in FIG. 1. The system is comprised of a microprocessor or microcontroller (103) (hereinafter referred to as the controller) to control the system. The controller (103) controls power switches (106–108) to an external accessory (computer, facsimile machine, etc.) (109), as well as to the modem (102) and radiotelephone (101), as required by the process of the present invention, illustrated in FIGS. 2A and B. The power control switches (106, 108) to the accessory and the radiotelephone are coupled to ground while the switch (107) to the modem is coupled to the radiotelephone's battery or other power source.

The external accessory (109) communicates commands and data to the controller (103) via an asynchronous communications interface adapter (ACIA) (104). The controller (103) communicates commands and data to the modem (102) via another ACIA (111). If the external accessory (109) communicates over an RS-232 bus, a level translator (105) can be used to convert the RS-232 logic levels to TTL levels.

The radiotelephone (101) is coupled to the modem (102) by the radiotelephone's audio line (110). The modem (102) can then transmit or receive modulated data through the radiotelephone's transmitter or receiver. In the preferred embodiment, the radiotelephone's battery powers the modem (102). The battery is coupled to the modem (102) through a power control switch (107).

Figure 2A:
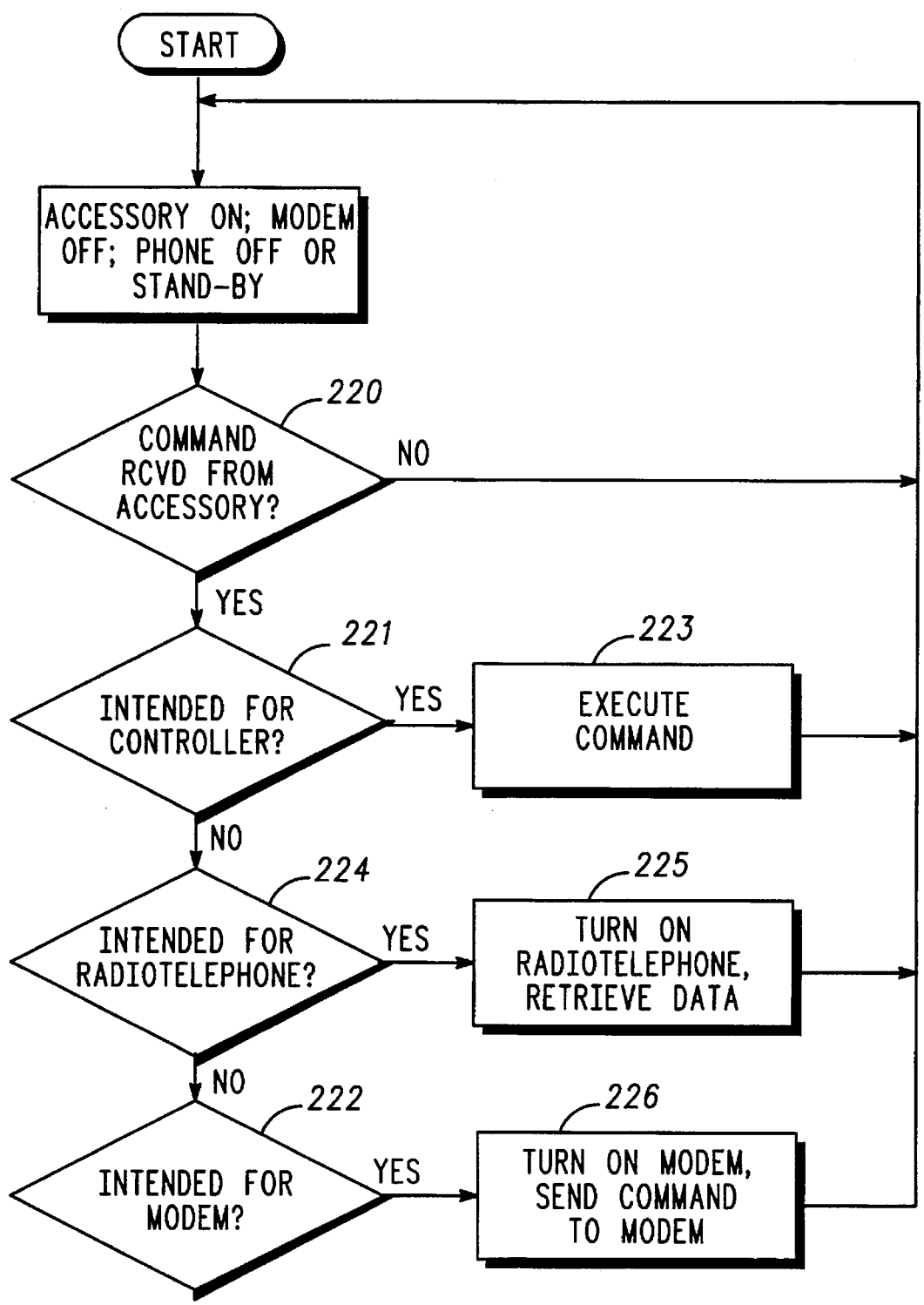
FIGS. 2A and 2B show flow diagrams of the process used by the controller of the communication system.
Figure 2B:
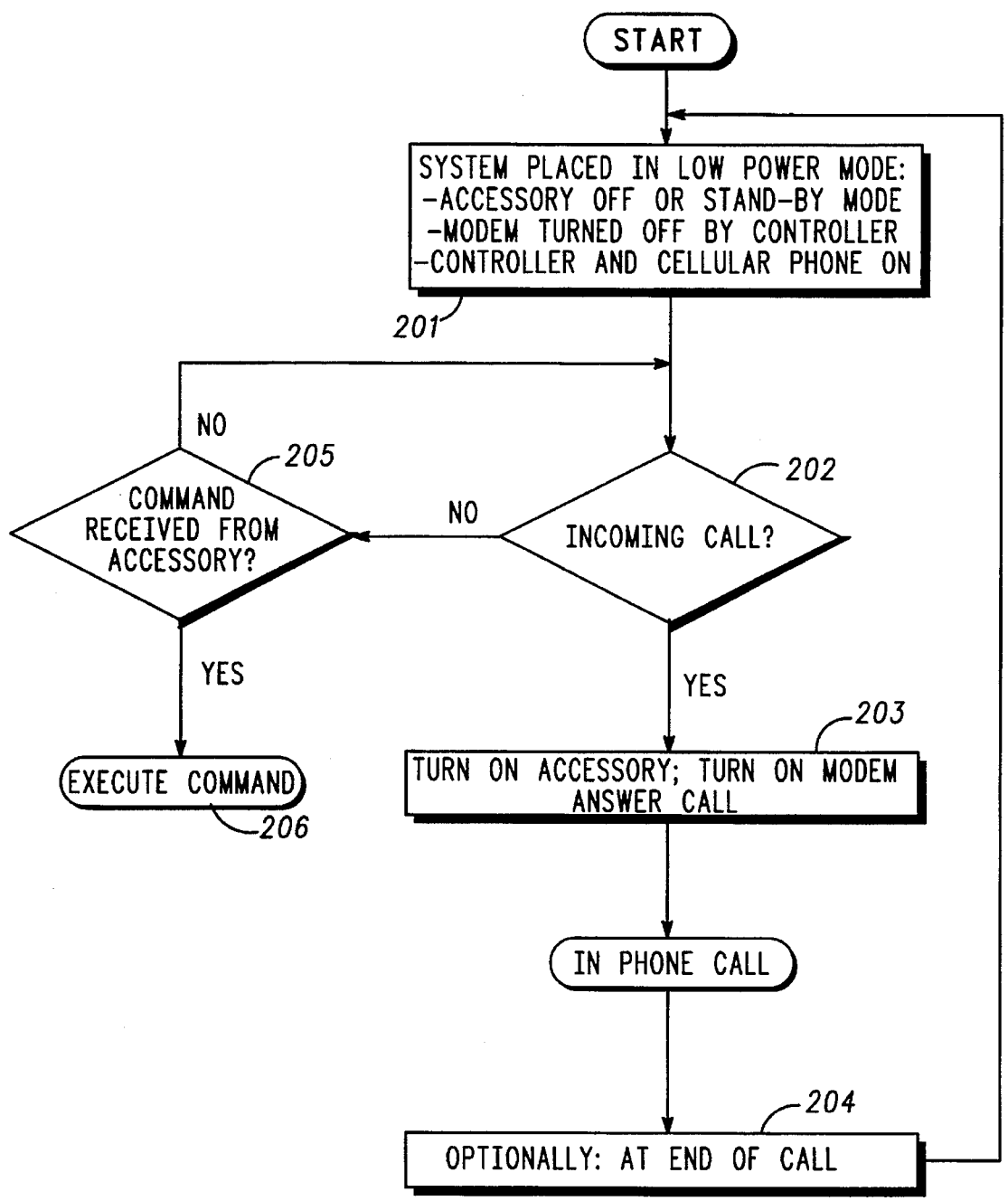

Referring to FIG. 2B, the radiotelephone is normally in a low-power stand-by mode when turned on and not in use (201). The accessory, if not being used, is off or also in a low-power stand-by mode (201). The modem is off (201). When a call is received from a base station (202), the radiotelephone goes into an active mode to receive the call. The call is indicated by a received ring signal that is also coupled to the controller. The controller, in response to this ring signal, turns on the accessory and the modem and the call is answered by the radiotelephone (203). Data is then received from the transmitting party. In one embodiment of the present invention, the controller can return the components of the system to their previous state of power (204).

If the accessory originates a command (205), the command is executed by the controller (206). An example of such a command is for the data communication system to originate a data transfer.

This data transfer process is illustrated in FIG. 2A. For this embodiment of the process, the accessory is on while the modem is off and the radiotelephone is off or in the standby mode. The accessory sends a command to the controller (220). If the controller determines the command is a power control command (221), the command is executed by the controller (223), e.g., the controller turns on the radiotelephone and modem. If the radiotelephone was already on and in the stand-by mode, the transmission of data will cause it to go into the active mode.

If the controller determines the command is to retrieve radiotelephone data (224), the controller turns on the radiotelephone if it was off and retrieves the data (225). This data could include received signal strength information (RSSI) or data from the radiotelephone's memory (i.e., telephone numbers).

If the controller determines the command is intended for the modem's intelligent controller (222), the controller turns on the modem and passes the command to the modem's controller (226). An example of such a command is the "AT" dial command. The modem's controller can then transfer the telephone number, attached to the command, to the radiotelephone for dialing. The accessory can now communicate, through the modem and radiotelephone, to another accessory that is using either a radiotelephone or a landline telephone and a modem.

If the accessory (109) is a computer, a data modem can be used. An example of such a modem is a UDS V.22bis. If the accessory (109) is a facsimile machine, a facsimile modem can be used. An example of such a modem is a Worldport 2496.

Once the call has been completed, the controller (103) removes power from the modem (102) and the radiotelephone (101). The accessory (109) is powered down by its own internal power-down algorithm. An alternate embodiment powers down the modem and radiotelephone automatically a predetermined time after the call has ended. Another alternate embodiment would power down the modem and radiotelephone a predetermined time after the last command has been sent from the accessory to the apparatus, if the radiotelephone is not in a call. Yet another embodiment would complete the power down procedure only after a command was sent from the computer instructing the power down to occur. Another embodiment could use the controlling controller to power-down the accessory after transfer of the data.

The data communication system can be built into the accessory (109). In alternate embodiments, the items of the communication system can be in separate enclosures or share the same enclosures. Also in alternate embodiments, all the components of the present invention can share the same power source or be combined in various combinations.

The data communication system described reduces the time a battery needs to power a modem combined with a radiotelephone by turning off both components when not needed. By reducing the time these components are drawing power, the battery use can be greatly extended.

We claim:

1. A power saving communications system comprising:

a first power source for producing power;

a radio telephone coupled to the first power source, for transmitting and receiving data signals and for generating a first power control signal;

an accessory for transmitting and receiving data signals;

a second power source for producing power;

a modem coupled to the radio telephone and to the accessory for demodulating received data signals and modulating data signals to be transmitted; and a controller for coupling power from the second power source to the accessory in response to the first power control signal.

2. A power saving communications system comprising:

a first power source for producing power;

a radio telephone for transmitting and receiving data signals;

a second power source for producing power;

an accessory coupled to the second power source that generates data signals and a second power control signal;

a modem coupled to the radio telephone and to the accessory for demodulating received data signals and modulating data signals to be transmitted; and a controller for coupling power from the first power source to the radio telephone in response to the second power control signal.

3. The power saving communications system according to claim 2, wherein the controller is responsive to the second power control signal for coupling power from the first power source to the modem.

4. A power saving communications system comprising:

a first power source for producing power;

a modem for demodulating received data signals and modulating data signals to be transmitted;

a radio telephone coupled to the modem, for transmitting and receiving data signals and for generating a first power control signal;

a second power source for producing power;

an accessory coupled to the modem for transmitting and receiving data signals and for generating a second power control signal; and a controller for coupling power from the first power source to the radio telephone in response to the second power control signal, for coupling power from the second power source to the accessory in response to the first power control signal, and for coupling power from the first power source to the modem in response to the first power control signal or the second power control signal.

5. The power saving communications system according to claim 4, wherein the accessory is a computer.

6. The power saving communications system according to claim 4, wherein the accessory is a facsimile machine.

* * * * *